United States Patent
Singer et al.

(10) Patent No.: US 10,120,712 B2
(45) Date of Patent: Nov. 6, 2018

(54) INSTRUCTION PRE-FETCHING

(71) Applicant: FREESCALE SEMICONDUCTOR, INC., Austin, TX (US)

(72) Inventors: Stefan Singer, Vaterstetten (DE); Jochen M Gerster, Stuttgart (DE); Michael Rohleder, Unterschleissheim (DE)

(73) Assignee: NXP USA, Inc., Austin, TX (US)

( * ) Notice: Subject to any disclaimer, the term of this patent is extended or adjusted under 35 U.S.C. 154(b) by 248 days.

(21) Appl. No.: 15/202,105

(22) Filed: Jul. 5, 2016

(65) Prior Publication Data
US 2018/0011735 A1    Jan. 11, 2018

(51) Int. Cl.
| G06F 9/48 | (2006.01) |
| G06F 9/38 | (2018.01) |
| G06F 12/0862 | (2016.01) |
| G06F 12/08 | (2016.01) |
| G06F 9/46 | (2006.01) |

(52) U.S. Cl.
CPC .............. *G06F 9/4881* (2013.01); *G06F 9/38* (2013.01); *G06F 9/3802* (2013.01); *G06F 9/3814* (2013.01); *G06F 9/3842* (2013.01); *G06F 9/46* (2013.01); *G06F 9/48* (2013.01); *G06F 9/4806* (2013.01); *G06F 9/4843* (2013.01); *G06F 12/08* (2013.01); *G06F 12/0862* (2013.01); *G06F 9/461* (2013.01)

(58) Field of Classification Search
None
See application file for complete search history.

(56) References Cited

U.S. PATENT DOCUMENTS

| 6,003,115 A | 12/1999 | Spear et al. |
| 6,701,131 B2 | 3/2004 | Kicklighter et al. |
| 2005/0138627 A1* | 6/2005 | Bradford ................. G06F 9/463 718/107 |
| 2005/0138628 A1* | 6/2005 | Bradford ............... G06F 9/3802 718/107 |
| 2014/0019689 A1* | 1/2014 | Cain, III ............. G06F 12/0862 711/136 |

FOREIGN PATENT DOCUMENTS

CN      1195812 A      10/1998

OTHER PUBLICATIONS

Wikipedia Encyclopedia, "Demand paging" : www.wikipedia.org/wiki/Demand_paging. Jan. 2, 2015.

* cited by examiner

*Primary Examiner* — Qing Yuan Wu (57) ABSTRACT

Pre-fetching instructions for tasks of an operating system (OS) is provided by calling a task scheduler that determines a load start time for a set of instructions for a particular task corresponding to a task switch condition. The OS calls, and in response to the load start time, a loader entity module that generates a pre-fetch request that loads the set of instructions for the particular task from a non-volatile memory circuit into a random access memory circuit. The OS calls the task scheduler to switch to the particular task.

20 Claims, 4 Drawing Sheets

INSTRUCTION PRE-FETCHING

OVERVIEW

Aspects of various embodiments are directed to pre-fetching of a task, which can include instructions and embedded constant data, for tasks controlled by an operating system (OS).

Computer systems often benefit from a hierarchical memory design in which (partial) copies of the memory contents can be stored (cached) at different levels within the memory hierarchy. Often, the hardware supporting the different memory levels have different capacities, costs, and access times. Generally speaking, smaller, faster memory circuits are located near the processor cores or other bus masters within the system and serve as caches for the main memory. Slower memories and especially the main memory are larger, but also relatively slow compared to those memories acting as caches. Some levels of this memory hierarchy may be located on the same semiconductor device than the processor cores or other masters, while other levels may be located on another semiconductor device. The information in main memory can be loaded from non-volatile memory circuits that can have even longer memory access times than the main memory.

Many OSs provide multi-tasking options that allow multiple different tasks to appear to be running concurrently on the same processor core, even though each processor core is only executing instructions (or code) for a single task at any given point in time. The appearance of simultaneous execution is provided by switching executing between the tasks, often before any particular task has completed its execution. The switching can be handled by a scheduler module that determines when to switch tasks and which task to switch.

A particular type of operating system has a task scheduler module (or just a "task scheduler") that provides a predictable consistency concerning the amount of time it takes to accept and complete an application's task. Such operating systems are sometimes referred to as real time operating systems (RTOS). Real time operating systems can be particularly useful in computer systems that have critical timing requirements (e.g., as often found in embedded systems that are used in the automotive industry). A particular important class of related RTOSs use a method called pre-emption, which interrupts a task being carried out by a computer system in order to switch to another task. The task switch can be carried out without requiring cooperation from the task being stopped and with the intention to resume execution of the stopped task at a later time. A RTOS having such a capability is usually called a pre-emptive RTOS.

These and other matters have presented challenges to efficiencies of computer system implementations, for a variety of applications.

SUMMARY

Various example embodiments are directed to issues such as those addressed above and/or others which may become apparent from the following disclosure.

In certain example embodiments, aspects of the present disclosure involve generating pre-fetch requests to load task instructions into main memory, and determining a load start time for beginning the pre-fetch requests.

Consistent with some embodiments of the present disclosure, a method is provided for pre-fetching instructions for tasks under the control of an operating system (OS). The method includes calling, by the OS, a task scheduler in response to a first task scheduler event. The task scheduler identifies a future task switch condition corresponding to a particular task and a task switch time; accesses, in response to identifying the task switch condition, a task information queue to retrieve task information for the particular task; and determines, based upon the task information and the task switch time, a load start time for a set of instructions for the particular task. The OS calls the task scheduler in response to the load start time. The task scheduler calls a loader entity module that generates, a pre-fetch request to load the set of instructions for the particular task from a non-volatile memory circuit into a random access memory circuit. The OS calls, in response to a second task scheduler event, the task scheduler. The task scheduler switches, in response to the task switch time, to the particular task.

Various embodiments of the present disclosure are directed toward a system that includes a computer processor circuit that is configured for pre-fetching instructions for tasks under the control of an operating system (OS) by executing code that causes the computer processor circuit to call, by the OS, a task scheduler in response to a first task scheduler event. The task scheduler is configured to: identify a future task switch condition corresponding to a particular task and a task switch time; access, in response to identifying the task switch condition, a task information queue to retrieve task information for the particular task; and determine, based upon the task information and the task switch time, a load start time for a set of instructions for the particular task. The execution of code also causes the computer processor circuit to call, by the OS, the task scheduler in response to the load start time. The task scheduler is configured to call a loader entity module. The loader entity module is configured to generate, a pre-fetch request to load the set of instructions for the particular task from a non-volatile memory circuit into a random access memory circuit. The processing circuit is further configured to call, by the OS and in response to a second task scheduler event, the task scheduler. The task scheduler is also configured to switch, in response to the task switch time, to the particular task.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving pre-fetch requests for populating a main memory. In particular embodiments, the main memory can be located within the same semiconductor die as processor cores that execute instructions retrieved, in response to the pre-fetch requests, from a non-volatile memory that is located outside of the semiconductor die, whether or not the non-volatile memory resides in the same package. In certain implementations, aspects of the present disclosure have been shown to be beneficial when used in the context of pre-emptive real time OSs. In some embodiments, memory access latency of an external non-volatile memory circuit can be hidden through the use of memory pre-fetches that are scheduled based upon foreseeable task switch events that are controlled by a task scheduler module of the OS. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various embodiments of the present disclosure are directed toward a computer system that generates task pre-fetches to load task data, which can include instructions and any constant data, from an external non-volatile memory circuit into an internal, random access memory (RAM) circuit. Particular aspects relate to a task scheduler module (also referred to herein as "task scheduler" or just "scheduler") that uses pre-emptive task scheduling and to controlling the timing of these pre-fetches based upon the task scheduling. The task scheduler module ensures that the pre-fetches begin soon enough for the instructions of a particular task to be loaded before the particular task is given control and allowed to execute within the OS environment.

Some embodiments of the present disclosure are directed toward a system-on chip (SoC) that has at least one processor core and a main memory circuit, such as a RAM circuit. The SoC includes a memory connection port that provides at least one data channel for accessing data from an external memory circuit, such as a non-volatile (flash) memory circuit that is located on a different semiconductor die. The accesses to the external memory circuit over this port are performed by a dedicated hardware circuit, which is referred to as the hardware (HW) loader circuitry. The HW loader circuitry responds to a pre-fetch request by loading data from the external memory circuit into a memory circuit internal to the SoC. The SoC is configured with an OS that uses a task scheduler to provide pre-emptive multitasking capabilities. In addition to controlling task switches, the task scheduler uses scheduling information to identify tasks that will be run in the future. The OS then generates pre-fetch requests that populate the main memory circuit with instructions for the future tasks. The pre-fetch requests can be issued before the task transitions to a running status, e.g., while the task is still in a blocked, suspended, or ready status.

According to particular implementations, the OS calls a task scheduler in response to a task scheduler event, which can be generated by scheduling timer or an event responsive to a modification of a task property (e.g. a task priority change). The task scheduler then identifies a task switch condition corresponding to a particular task and a task switch time. The task switch time indicates a time or a time range at which the particular task is expected to be given control and allowed to execute. The task scheduler accesses a task information queue to retrieve task information for the particular task, and determines, based upon the task information and the task switch time, a load start time for a set of instructions for the particular task. The load start time indicates when the pre-fetch requests are to be generated. When the load start time occurs, the OS calls a loader entity module. The loader entity module generates a pre-fetch request that identifies the set of instructions (and constant task data) for the particular task. The pre-fetch request can be provided a HW loader circuitry that retrieves the instructions (and any related constant data) from a non-volatile memory circuit and stores them in a random access memory circuit. As discussed herein, the pre-fetch request can identify instructions and data for the entire task or for just a portion of the task. When the task switch time occurs, OS again calls the task scheduler in order to perform a task switch for the particular task.

Figure 1:
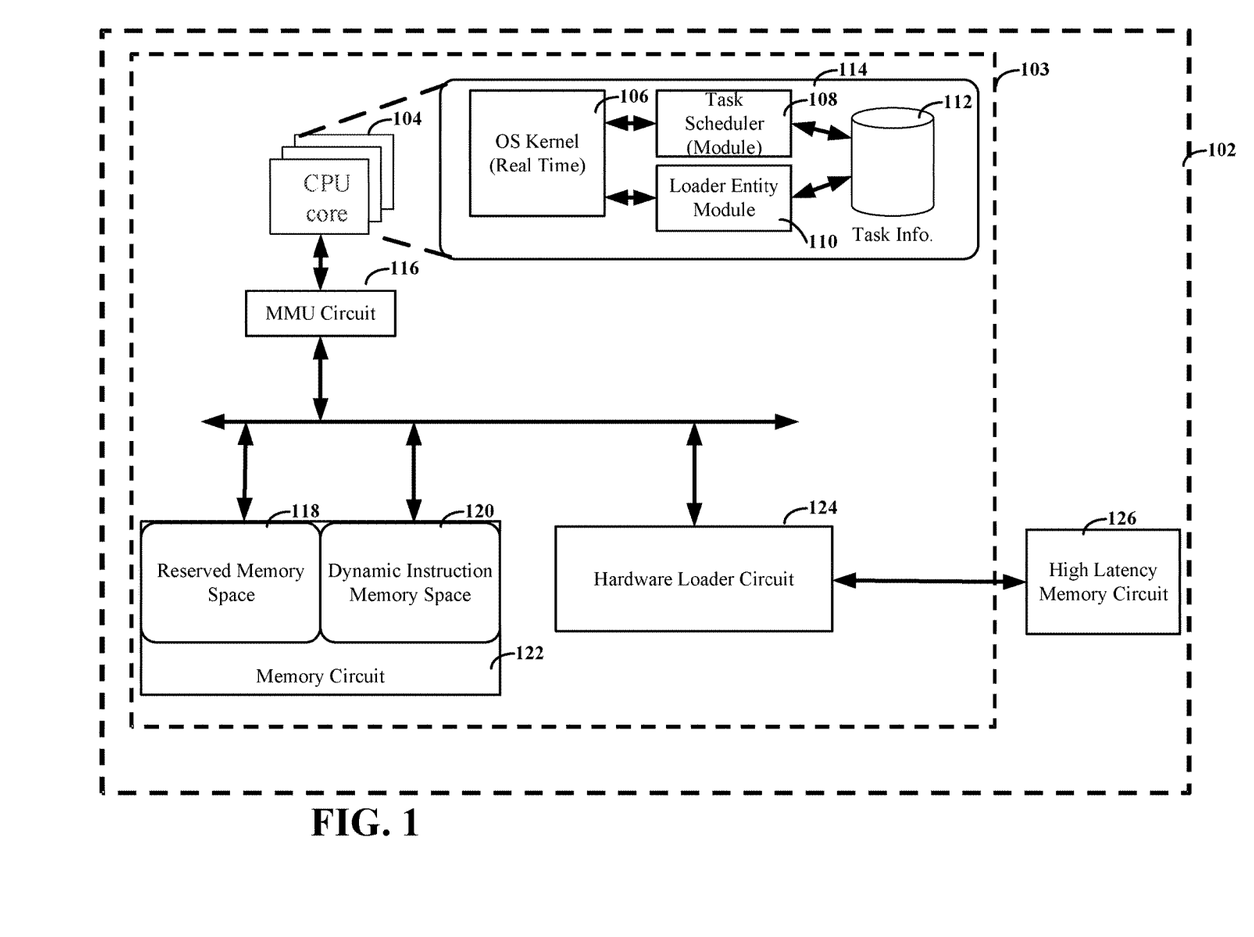
FIG. 1 depicts a block diagram for a computer system, consistent with embodiments of the present disclosure.

Turning now to the figures, FIG. 1 depicts a block diagram for a computer system, consistent with embodiments of the present disclosure. A computer processing device 102 is part of computer system, and includes various computer circuits. In particular embodiments, the computer processing device 102 is an SoC that includes multiple circuits within a single integrated circuit (IC) chip, or a System in Package (SiP) 102 that includes multiple chips within a single IC package. SoCs and SiPs can be particularly useful for embedded applications where factors such as physical size, power, and cost are limiting. In certain embodiments, the circuits in the computer processing device 102 can be implemented on multiple IC chips and IC packages.

The circuits of computer processing device 102 include one or more semiconductor dies. For example, a semiconductor die 103 can include one or more central processing unit (CPU) cores 104. Each CPU core 104 is connected to one or more memory circuits 122. In particular embodiments, memory circuit 122 can be volatile memory that serves as the main memory for the CPU cores 104. Instructions and data are copied into main memory to allow access by the CPU cores 104. As discussed herein, the instructions can be loaded from a non-volatile memory circuit 126 that is not directly accessible by the CPU cores (or other master devices). In particular, instructions and data are stored on one or more high-latency, non-volatile memory circuits 126 and the content of the memory circuits 126 is only indirectly accessible (by way of hardware loader circuitry 124 loading data in to memory circuit(s) 122).

The memory circuit(s) 126 are depicted as being located on the SiP 102, however the memory circuit 126 can also be external to the SiP 102. Memory circuit 126 provides non-volatile storage with a latency that is relatively high when compared to the latency of the memory circuit 122. In particular embodiments, memory circuit 126 is a programmable read-only memory (PROM) that CPU cores 104 do not have write access to during normal operation. In this manner, the instructions and a data stored therein are constant with a set size and location that are known throughout execution by the OS. The memory circuit (s) 126 can, in some embodiments, be programmable through a separate interface (e.g., as part of a firmware update procedure).

The instructions and constant data can be copied to memory circuit 122 so that they can be subsequently accessed by CPU cores 104. In certain embodiments, analog and input/output (I/O) circuits can provide additional data to the CPU cores 104. The I/O circuits can, for example, provide data from various sensors to the CPU cores 104, and provide data from the CPU cores 104 to output circuits. In the automotive environment, as a possible example, the inputs could be from temperature sensors (or other types of sensors), or vehicle controls (e.g., brake pedal). The outputs could be warning indicators (e.g., faulty engine light) or safety circuits (e.g., engine shutoff).

According to embodiments of the present disclosure, the CPU cores 104 can be configured to access data stored in memory circuit 122 according to an OS environment 114. The OS environment 114 is controlled by the OS kernel 106. In particular embodiments, the OS kernel 106 is a real time OS kernel that provides pre-emptive task scheduling for tasks under the control of the OS and executed by CPU cores 104. The task scheduling can be provided by a task scheduler 108 (e.g., using time slicing or priority based scheduling). The task scheduler 108 accesses a task information queue 112, often implemented by a table, list or queue of task control blocks (TCBs) or entries that refer to such information. The task information queue 112 contains information about tasks that is used by the task scheduler 108 to schedule and implement task pre-fetch operations. The task scheduler can also access a TCB to implement task switch operations for each of the CPU cores 104. During a task switch operation, the state information, or execution context data, for a current task can be stored for future use. The state information can include, amount other things, the CPU register contents and the stack.

According to various embodiments of the present disclosure, the CPU cores 104 retrieve instructions for a particular task from the memory circuit 122, but the memory circuit 122 is not large enough to store instructions for every possible task, as stored in the comparatively large non-volatile memory circuit 126. Accordingly, the computer processing device 102 can be configured to use virtual memory that allow for the effective memory space to be extended beyond the physical size of the main memory, as provided by the memory circuit 122. The OS handles the copying of instructions from the memory circuit 126 to the memory circuit 122 so that they can be executed by the CPU cores 104.

According to various embodiments of the present disclosure, the use of pre-fetch requests and hardware (HW) loader circuitry 124 can be effective at hiding latency associated with a slow non-volatile memory circuit 126. In particular, the HW loader circuitry 124 can load task data (instructions and possibly constant data) into the memory circuit 122 before executing the task that requires access to the task data. In certain situations, it is possible that access to task data is required before the task data has been loaded from the non-volatile memory circuit 126. For example, an unexpected task switch event might result in a task attempting to execute before a pre-fetch and loading of the task data is possible. This might happen, for example, in response to an interrupt event that causes an unexpected task switch. As another example, the time required to completely load future task data from non-volatile memory circuit 126 might be greater than the execution time for tasks executing before the future task data. This results in the executing tasks completing before the future task data can be loaded by the HW loader circuitry 124. Such situation can cause an error condition that causes some hardware reaction (page fault) upon accessing a not yet loaded task data; which itself may be processed by an operating system.

Consistent with embodiments of the present disclosure, a loader entity module 110 is used to generate task pre-fetch requests for copying data from non-volatile memory circuit 126 to memory circuit 122 before the data is required by the OS and running tasks. The pre-fetch requests each specify a set of instructions for a particular task and result in the corresponding set of instructions being loaded from the non-volatile memory circuit 126 into the memory circuit 122. The requests are considered pre-fetches because they are generated before the CPU cores 104 attempt to access the corresponding set of instructions from the memory space of the computer processing device 102. In this manner, page faults can be avoided by pre-emptively loading instructions into the memory circuit 122.

In specific embodiments of the present disclosure, the task scheduler 108 identifies future tasks for execution based upon the information stored in the task information queue 112. The task scheduler 108 can then determine whether or not the instructions for the future tasks currently reside in the main memory. For example, the task scheduler can maintain a lookup table specifying the memory location for the corresponding instructions, either as part of the task information queue 112 or as a separate table. For tasks that do not currently reside in main memory, the task scheduler determines a load start time for a set of instructions for the particular task. The load start time is then used as an indication for when the loader entity module 110 is called. The loader entity module 110 then sends pre-fetch requests to the HW loader circuitry 124, which begins loading instructions from memory circuit 126 into the main memory of memory circuit 122. Consistent with some embodiments, the HW loader circuitry 124 is configured to queue multiple pre-fetch access requests at a time. This allows the loader entity module 110 to quickly issue a block of individual pre-fetch access requests and then relinquish control of a CPU core back to the OS and any currently-active task. The HW loader circuitry 124 then completes the memory loading operations for the queued access requests.

According to some embodiments of the present disclosure, a MMU circuit 116 can provide address translation between the virtual memory space and the physical memory space. CPU cores 104 generate virtual memory access requests specifying addresses corresponding to the virtual memory space. The MMU circuit 116 receives the virtual memory access requests and generates memory access requests for corresponding physical addresses.

In certain embodiments, memory circuit 122 includes two memory spaces, dynamic instruction memory space 120 and reserved memory space 118. Both memory spaces store instructions for tasks, but dynamic instruction memory space 120 is configured to allow for different sets of instructions to be loaded from the non-volatile memory circuit 126 by the HW loader circuitry 124. Reserved memory space 118 can store sets of instructions that are static and that the loader entity module 110 is not able to evict. For example, the reserved memory space 118 can store instructions that require very low latency for their execution, and are relatively small. In particular, reserved memory space 118 can store instructions for interrupt service routines. Because the reserved memory space 118 is not subject to changes from the loader entity module 110, the memory space can be directly mapped into the memory circuit 122 when accessing the reserved memory space 118. Thus the MMU circuit 116 might not perform memory address translations and the reserved memory space 118 could be directly accessed by the CPU cores 104. In certain implementations, the reserved memory space 118 may also involve address translations by the MMU circuit 116.

According to various embodiments of the present disclosure, the loader entity module 110 is configured to generate instruction pre-fetch requests according to sets of instructions (a "loader entity") of a size corresponding to a particular memory address range (a "load size"). The load size may be smaller than the total size of a particular task, and subsequently, a task may be broken into multiple loader entities. For example, a particular task may have a set of instructions that span ten pages of memory. The size of the first loader entity of this task may correspond to an address range that spans three pages of memory. The first data in the first loader entity can be selected based upon the instructions that are expected to be first executed when the particular task begins (or resumes) execution. When the loader entity module 110 is first called for the particular task, it generates instruction pre-fetch requests for the three memory pages related to this first loader entity. This can be useful for situations where a large task would result in a long load time. The result of such long load time could be a prohibitively large load anticipation window, which may impede the ability to fulfill the real time requirements of the RTOS or a significant amount of data thrashing due to excessive calling of the loader entity module 110. To accommodate a loading size with a granularity smaller than an entire task, the task scheduler 108 can be configured to generate load times for load operations corresponding to the particular loader entity size; which might vary for the loader entities within one task. In this manner, the task scheduler 108 might create several, additional load times for a single task. According to particular embodiments, the load size is set according to an expected task switch frequency. For instance, if the task scheduler uses time slicing, the load size could be set to match a number of instructions that can be executed within a single time slice.

Figure 2:
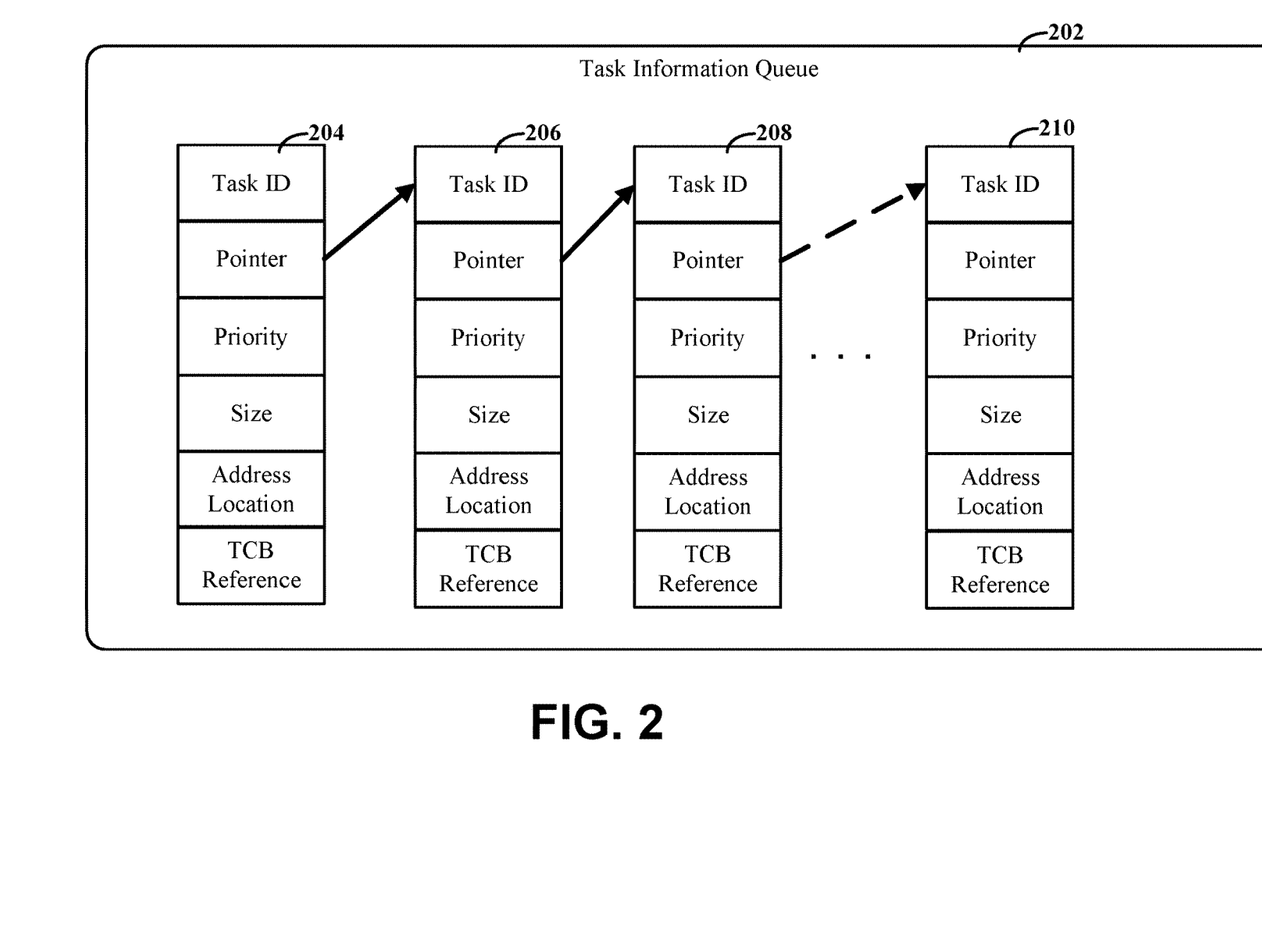
FIG. 2 depicts a logical representation of a task control block (TCB) queue, consistent with embodiments of the present disclosure.

FIG. 2 depicts a logical representation of a task information queue, consistent with embodiments of the present disclosure. In particular embodiments, the task information queue 202 contains task information entries 204, 206, 208, and 210, which each contain data describing a corresponding task. The task information queue 202 can include information that specifies address locations for task data within the non-volatile memory circuit. Moreover, the task information queue 202 can include (either directly or indirectly through a reference to another data structure) task information that is used by the OS for task-related operations. The task-related operations can include, but are not limited to, modifications that change the task scheduling order.

In some embodiments, the task information queue 202 can be implemented within a TCB queue structure, which allows the reuse of overlapping data fields between the TCB queue structure and the task information queue 202. In other implementations, a separate data structure can be used for the task information queue 202. The OS and task scheduler can also make use of additional information about the task that is not within the task information queue 202. If the additional information is within a TCB queue structure, for example, the task information queue 202 can include a TCB reference. The TCB reference can be a value that is used as an index to retrieve the task information from the TCB queue structure. Other types of tables and data structures and could also be used to provide additional information. Moreover, indirect indexing could be done using, for example, the task ID to find the appropriate information.

Each task information entry is shown as including a task identification (ID) The task ID can uniquely identify each task. A pointer can provide an indication of the next task to be executed. The depicted task information queue 202 is configured as a linked-list of task entities, with the last pointer indicating the end of the list (e.g., using a NULL value).

Additional information for the task that can also be stored in the task information queue 202 includes a priority of the task, and an address location(s) for the instructions of the task. The address location information specifies a start address and an end address. The start and end addresses can be specified in several different manners. For example, the start address can be stored as a specific address location ("A"), while the end address location ("B") can be inferred from a size ("N") that corresponds to the amount of instructions and constant data. The actual end address is then determined as B=A+N, wherein N corresponds to the addressable granularity of the non-volatile memory circuit. Alternatively, both the start and end address can be directly specified with corresponding addresses. It might also be possible to directly specify the end address (B), while inferring the start address from a provided size: A=B−N. The particular examples of task entry information are not limiting. For example, a task entry can store process control information, such as process state, process privileges, CPU registers used by the task, and a program counter or further optional information.

When the task scheduler 108 is called by the OS kernel it can access the task information queue 202 and identify the next task that is scheduled to be called. The task scheduler 108 can also determine whether or not the next task already resides in the main memory. If not, the task scheduler 108 then determines the load time based upon the amount of data that is to be loaded into main memory for the particular task and an expected execution time, or execution time range, for the particular task. This step may be iterated not only for the next to be called task, but also for the next n to be called tasks. Increasing the size of n can reduce the likelihood of pre-fetches not being completed in time for execution. It is noted that increasing the size of n can also increase the adverse effects of wrong predictions on task execution order. Other considerations for setting the value of n are also possible.

Figure 3:
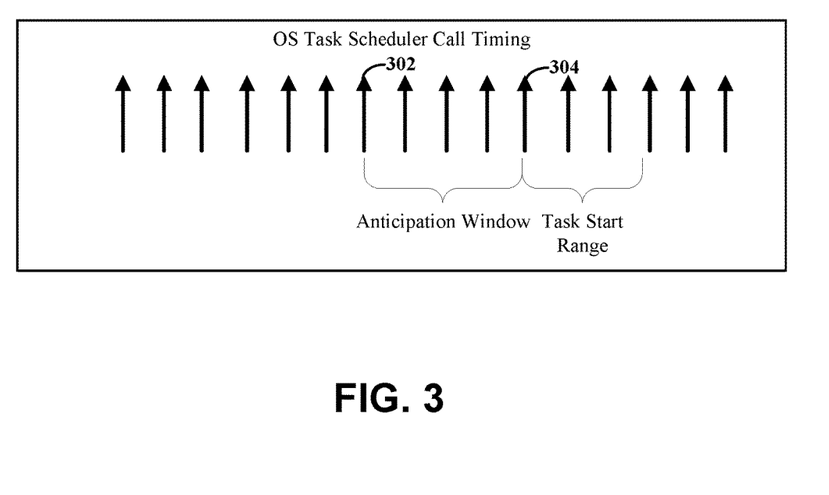
FIG. 3 is a timing diagram that depicts scheduling timings and loading timings, consistent with embodiments of the present disclosure.

FIG. 3 is a timing diagram that depicts scheduling timings and loading timings, consistent with embodiments of the present disclosure. Each arrow represents a time point during which the task scheduler may be called. According to some implementations, a timer can be used by the OS to create a periodic call of the task scheduler; alternatively or additionally the task scheduler may be called upon certain events of the OS, e.g. when a task state change is requested, a task relinquishes control because it needs to wait for a resource or event, etc. Once called, the task scheduler can determine whether a task switch should be carried out to allow a new task to execute on a CPU core. The task scheduler can also identify the next task to be called in order to determine a load time. For example, the task scheduler can identify a next task in the task information queue. The task scheduler then identifies a task switch time (start time) for the next task. Consistent with some embodiments, the start time can be indicated by a range of possible start times, as indicated by the identified task start range in FIG. 3. The task scheduler can select the earliest possible start time, as indicated by position 304.

The task scheduler then determines a load anticipation time or window for the loading operation associated with the identified task. For situations in which the entire task is to be loaded (as opposed to a smaller load size), the anticipation window can be calculated by taking the time for each load operation (e.g., time to read an instruction from the external memory and to store it into the memory) and multiplying this load time by the number of transactions necessary to load the entire task. In some instances, the starting address of the task instructions is taken into account to determine the number of necessary transactions. For example, the total size of a block of instructions for a task might be small enough to fit within three pages when properly aligned with the start of the pages, but the task would reside in four pages depending upon the actual alignment of the block of instructions relative to the memory pages.

The task scheduler then sets a load start time event at the time indicated at position 302. In the depicted example, position 302 is determined by subtracting the anticipation window from to the earliest possible start time for the task. This helps to ensure that the task instructions have been loaded into main memory before the task begins execution. In some embodiments, an additional time can be added to the anticipation window to provide a margin of error between the actual load start time and the expected load start time.

Figure 4:
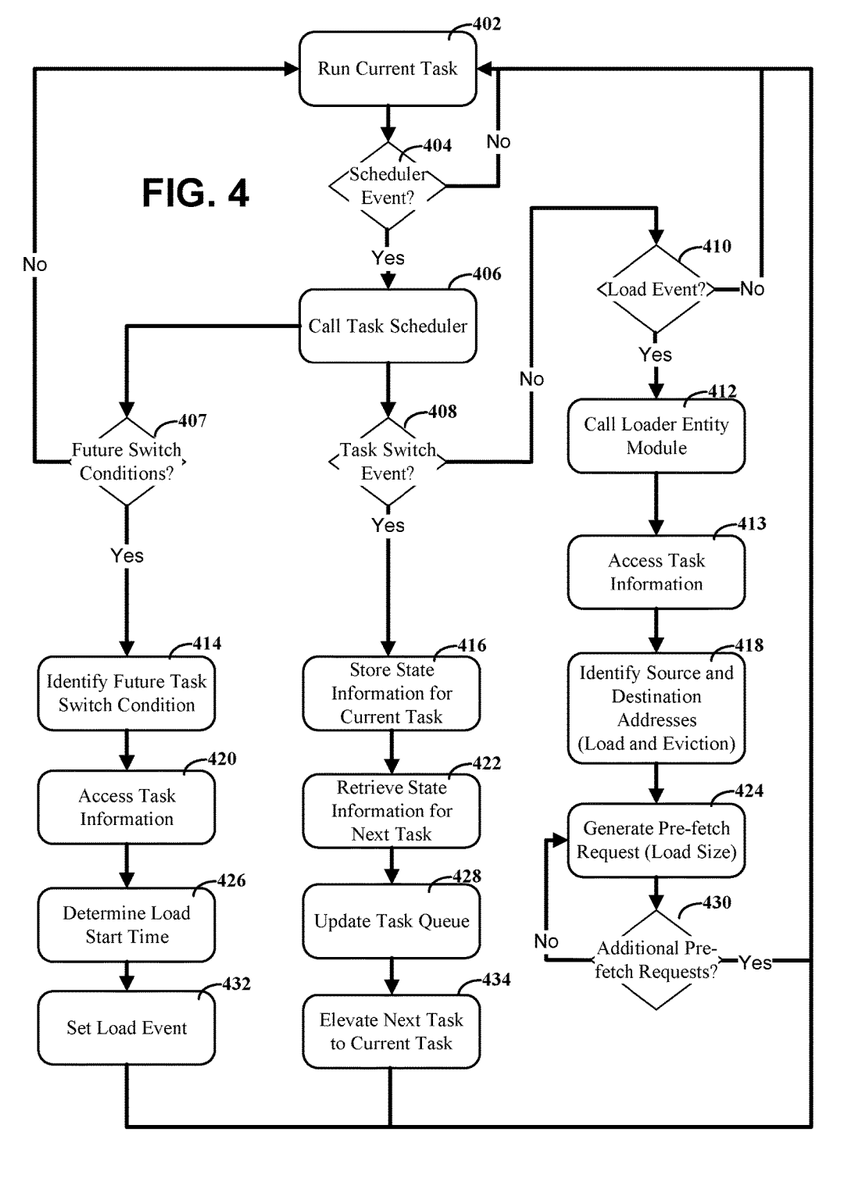
FIG. 4 is a flow diagram for handling task scheduling and task loading, consistent with embodiments of the present disclosure.

FIG. 4 is a flow diagram for handling task scheduling and task loading, consistent with embodiments of the present disclosure. A currently active task can continue to execute or run, per block 402, until a task scheduler event occurs, as indicated by block 404. The task scheduler event can be periodic (e.g., triggered by a timer every 'X' number of clock cycles), event driven (e.g., priority change indication), or by the task itself relinquishing control to the scheduler. The OS then calls a task scheduler, per block 406. Since the task scheduler itself can run on one of the CPU cores, it may interrupt the active task. Subsequently, the calling of the task scheduler can involve a task switch e.g. from the currently active task to another, higher priority task.

The task scheduler can next determine whether there is a task switch event, per block 408, and also whether or not there is a load event, per block 410. The task switch event indicates that a new task should be given control by performing a task switch operation. The task scheduler module can perform the task switch operation by storing the state information for the current task in the task information queue, per block 416. The state information can include CPU register contents, program counter contents, and other information for allowing the task to be gracefully restarted at a later time. The task scheduler module then retrieves state information for the next task from the task information queue, per block 422. The task information queue can then be updated based upon the changes flowing from the task switch operation, per block 428. This can include elevating the status of the next task to active and placing the current task at a new location within the task information queue. The next task is then elevated to the current task by updating the CPU core registers and the OS, per block 434.

According to certain embodiments, the task scheduler module can determine whether or not there are future task switch conditions, per block 407. The determination can be carried out in a manner that is substantially independent from the decisions corresponding to blocks 408 and 410. For example, the determination of block 407 can be carried out either before or after the determinations in blocks 408 and 410. This allows the task scheduler to optionally determine load start times for each call of the task scheduler, irrespective or other actions that the task scheduler might take. If the load start times are not determined on a particular call of the task scheduler, a task switch or pre-fetch request can be generated, or the task scheduler could return control to the running task, without further action. The task switch condition identified in block 414 can correspond to the next task switch event as determined by the task scheduler. For example, the task scheduler can access the task information queue and identify that there are additional tasks waiting to execute. The identified task switch condition can correspond to various types of preemption events, such as a task having a higher priority than other tasks (potentially including the currently running task), and a time slice window. The task scheduler can identify an expiration time for a time slice; and determining which task is assigned to the subsequent time slice. The task scheduler then accesses the task information for the next task, per block 420. This can include obtaining information about the task size and location in order to determine the number of load operations that are required to load the task into main memory.

The task scheduler module then determines a load start time, per block 426. The load start time can be based upon the expected execution start time of the next task and the anticipation window. As discussed herein, the anticipation window can correspond to the amount of time required to load the instructions for the task into main memory using pre-fetches. In situations where the task scheduler provides deterministic timing for task execution start, this information is used to determine the load start time; otherwise it will estimate a load start time by applying the anticipation window to the earliest time for the task switch to happen (e.g. in case of a time range). A load event indicator can then be set, per block 432. The load event indicator can be, for example, a time stamp that indicates when the corresponding pre-fetches should be started.

If such a load event is detected, per block 410, then a loader entity module can be called, per block 412. In some implementations, the load event identifies a particular task by task ID and the loader entity module uses the task ID to access task information from the task information queue, per block 413. The task information can include information about the current address range for the set of instructions. The loader entity module can use this information to determine the source and destination locations (physical addresses) for copying the set of instructions into main memory, per block 418. The loader entity module then generates one or more instruction pre-fetch requests, per block 424. In some instances, the pre-fetch requests encompass all instructions for the task. In other instances, the pre-fetch requests cover a set of instructions corresponding to a load size, which can be less than all of the instructions for the task. Since the transfer itself can be performed by an independent hardware circuit, the HW loader circuitry, the loader entity module can relinquish control to the OS, per block 430 after providing each of the pre-fetch request(s). When there is more than one pre-fetch request, the loader entity module may generate multiple pre-fetch requests until all pre-fetch requests have been provided to the HW loader circuitry. Alternatively, the flow 412 to 430 may be called multiple times for each separate pre-fetch request.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The Specification describes and/or illustrates aspects useful for implementing the claimed disclosure by way of various circuits or circuitry which are discussed in the context of terms such as blocks, modules, and tasks. Such circuits or circuitry are used together with other elements. The circuit structure is exemplified through a discussion of the related embodiments and the corresponding structures, steps, functions, operations, activities, etc. For example, in certain of the above-discussed embodiments, one or more illustrated items in this context represent circuits (e.g., CPU circuit, discrete logic circuitry or (semi-)programmable circuits) configured and arranged for implementing these operations/activities, as may be carried out in the approaches shown in FIG. 4. In certain embodiments, one or more computer processing circuits or CPUs are configured by way of memory circuitry that stores code (program to be executed as a set/sets of instructions) for performing a specific set of operations.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. A method for pre-fetching instructions for tasks under the control of an operating system (OS), the method comprising:
    calling, by the OS, a task scheduler in response to a task scheduler event, the task scheduler:
        identifying a future task switch condition corresponding to a particular task and a task switch time;
        accessing, in response to identifying the task switch condition, a task information queue to retrieve task information for the particular task; and
        determining, based upon the task information and the task switch time, a load start time for a set of instructions for the particular task based on a load anticipation time for the set of instructions;
    calling, by the task scheduler in response to the load start time, a loader entity module, the loader entity module generating, a pre-fetch request to load the set of instructions for the particular task from a non-volatile memory circuit into a random access memory circuit,
        wherein the set of instructions includes less than all instructions in the particular task and less than all constant data for the particular task, and
        wherein the loader entity module generates additional load anticipation times for additional sets of instructions for the particular task; and
    switching, by the task scheduler and in response to the task switch time, to the particular task.

2. The method of claim 1, wherein identifying the future task switch condition further comprises determining that a priority for the particular task is higher than a priority for other tasks in the task information queue.

3. The method of claim 1, wherein identifying the future task switch condition further comprises: identifying an expiration time for a time slice; and determining that the particular task is assigned to a subsequent time slice.

4. The method of claim 1, wherein determining, based upon the task information, the load start time for the particular task further comprises: determining an entire load anticipation time for the particular task as a function of a size of all instructions in the particular task and access time for the non-volatile memory circuit; and subtracting the entire load anticipation time from the task switch time to result in the load start time.

5. The method of claim 4, further comprising determining the task switch time by selecting, as the task switch time, an earliest start time from a range of potential start times for the particular task.

6. The method of claim 5, wherein the entire load anticipation time for the particular task includes the load anticipation time of the set of instructions for the particular task and the additional load anticipation times for additional sets of instructions for the particular task.

7. The method of claim 1, wherein the OS is a real time OS that is executing on a processor core of an integrated circuit (IC) die and wherein the non-volatile memory circuit is a programmable read-only memory that is external to the IC die.

8. The method of claim 7, wherein the task information queue includes task entries that specify a start address location and an end address location for the set of instructions in the non-volatile memory circuit, and task information used by the operating system.

9. The method of claim 1, further comprising evicting, in response to the pre-fetch request, a resident set of instructions for another task from a first memory space within the random access memory circuit, and wherein the OS reserves a second memory space within the random access memory circuit for instructions that the loader entity module is not allowed to evict.

10. The method of claim 9, wherein the instructions in the second memory space includes instructions for interrupt service routines.

11. The method of claim 1, wherein the loader entity module is further configured to generate an additional pre-fetch request for each of the additional sets of instructions for the particular task.

12. A system comprising:
    a computer processor circuit that is configured for pre-fetching instructions for tasks under the control of an operating system (OS) by executing code that causes the computer processor circuit to:
    call, by the OS, a task scheduler in response to task scheduler events, the task scheduler configured to:
        identify a future task switch condition corresponding to a particular task and a task switch time;
        access, in response to identifying the task switch condition, a task information queue to retrieve task information for the particular task;

determine, based upon the task information and the task switch time, a load start time for a set of instructions for the particular task based on a load anticipation time for the set of instructions;

switch, in response to the task switch time, to the particular task; and call, in response to the load start time, a loader entity module, the loader entity module configured to generate a pre-fetch request to load the set of instructions for the particular task from a non-volatile memory circuit into a random access memory circuit, wherein the set of instructions includes less than all instructions in the particular task and less than all constant data for the particular task, and wherein the loader entity module generates additional loan anticipation times for additional sets of instructions for the particular task.

13. The system of claim 12, wherein the task scheduler is further configured to identify the future task switch condition by determining that a priority for the particular task is higher than other tasks in the task information queue.

14. The system of claim 12, wherein the task scheduler is further configured to identify the future task switch condition by: identifying an expiration time for a time slice; and determining that the particular task is assigned to a subsequent time slice.

15. The system of claim 12, wherein the task scheduler is further configured to determine the load start time for the particular task by: determining an entire load anticipation time for the particular task as a function of a size of all instructions in the particular task and access time for the non-volatile memory circuit; and subtracting the entire load anticipation time from the task switch time to result in the load start time.

16. The system of claim 15, wherein the task scheduler is further configured to determine the load start time by selecting, as the task switch time, an earliest start time from a range of potential start times for the particular task.

17. The system of claim 12, wherein the OS is a real time OS executing on a system on a chip (SoC) and wherein the non-volatile memory circuit is a programmable read-only memory that is external to the SoC.

18. The system of claim 17, wherein the task information queue includes task entries that specify a start address location and an end address location for the set of instructions in the non-volatile memory circuit and task information used by the operating system.

19. The system of claim 12, wherein the loader entity module is further configured to evict a resident set of instructions for another task from a first memory space within the random access memory circuit, and wherein the loader entity reserves a second memory space within of the random access memory circuit for a set of instructions that cannot be evicted by the loader entity module.

20. The system of claim 19, wherein the set of instructions that cannot be evicted include instructions for interrupt service routines.

* * * * *